United States Patent
Luo et al.

(10) Patent No.: US 11,719,123 B1
(45) Date of Patent: Aug. 8, 2023

(54) INTEGRAL COOLING SYSTEM FOR TURBINE CASING AND GUIDE VANES IN AEROENGINE

(71) Applicant: Beihang University, Beijing (CN)

(72) Inventors: Xiang Luo, Beijing (CN); Zhe Zhang, Beijing (CN); Dongdong Liu, Beijing (CN); Zeyu Wu, Beijing (CN)

(73) Assignee: Beihang University

(*) Notice: Subject to any disclaimer, the term of this patent is extended or adjusted under 35 U.S.C. 154(b) by 0 days.

(21) Appl. No.: 17/877,088

(22) Filed: Jul. 29, 2022

(30) Foreign Application Priority Data

Apr. 11, 2022 (CN) .......................... 202210374112.8

(51) Int. Cl.
| F01D 25/12 | (2006.01) |
| F01D 25/14 | (2006.01) |
| F01D 5/18 | (2006.01) |
| F01D 9/04 | (2006.01) |
| F01D 25/10 | (2006.01) |
| F01D 25/08 | (2006.01) |

(52) U.S. Cl.
CPC .............. *F01D 25/12* (2013.01); *F01D 5/18* (2013.01); *F01D 5/181* (2013.01); *F01D 5/185* (2013.01); *F01D 9/041* (2013.01); *F01D 25/08* (2013.01); *F01D 25/10* (2013.01); *F01D 25/14* (2013.01); *F05D 2220/323* (2013.01); *F05D 2240/12* (2013.01); *F05D 2260/205* (2013.01); *F05D 2260/207* (2013.01); *F05D 2260/213* (2013.01)

(58) Field of Classification Search
CPC . F01D 25/12; F01D 5/18; F01D 5/181; F01D 5/185; F01D 9/041; F01D 25/08; F01D 25/10; F01D 25/14; F05D 2220/323; F05D 2240/12; F05D 2260/205; F05D 2260/207; F05D 2260/213
See application file for complete search history.

(56) References Cited

U.S. PATENT DOCUMENTS

| 5,782,076 | A * | 7/1998 | Huber .................... F02C 7/224 |
| | | | 415/115 |
| 8,789,377 | B1 * | 7/2014 | Brostmeyer .............. F02C 7/16 |
| | | | 60/806 |
| 9,353,687 | B1 * | 5/2016 | Brostmeyer ............ F01D 9/065 |
| 10,184,400 | B2 * | 1/2019 | Cerny .................... F02C 7/185 |
| 2017/0159566 | A1 * | 6/2017 | Sennoun .................. F02C 7/185 |
| 2018/0306042 | A1 * | 10/2018 | Zaccardi ................. F01D 25/12 |
| 2022/0228492 | A1 * | 7/2022 | Luo ........................ F01D 9/065 |

* cited by examiner

*Primary Examiner* — Brian Christopher Delrue
(74) *Attorney, Agent, or Firm* — Genius Patent APC; Bruce Angus Hare (57) ABSTRACT

An integral cooling system for a turbine casing and guide vanes in an aeroengine is provided, belonging to the field of research on flow and heat exchange of a turbine casing in an aeroengine. An inner guide ring and multiple of guide vanes are mounted on the turbine casing; the cooling system includes an electromagnetic pump, a heat exchanger, an expansion joint and a cooling pipeline; an annular cavity is provided in the turbine casing, the cooling pipeline is mounted on the inner wall of the annular cavity and periodically and uniformly distributed along the circumferential direction of the turbine casing, and the cooling pipeline is filled with cooling liquid; a mounting cavity is further provided in the turbine casing, and the mounting cavity communicates with the annular cavity; the electromagnetic pump, the expansion joint and the heat exchanger are all mounted in the mounting cavity.

10 Claims, 9 Drawing Sheets

INTEGRAL COOLING SYSTEM FOR TURBINE CASING AND GUIDE VANES IN AEROENGINE

CROSS-REFERENCE TO RELATED APPLICATION

This patent application claims the benefit of and priority to Chinese Patent Application No. 202210374112.8 filed on Apr. 11, 2022, the disclosure of which is incorporated by reference herein in its entirety as part of the present application.

TECHNICAL FIELD

The present disclosure relates to the field of research on flow and heat exchange of a turbine casing in an aeroengine, in particular to an integral cooling system for a turbine casing and guide vanes in an aeroengine.

BACKGROUND

One of key technologies of improving the thermal efficiency of the gas turbine is to increase the gas temperature before the turbine. However, excessively high gas temperature needs higher requirement on the performance of the hot end of the engine.

The turbine casing is one of main components for controlling the clearance of the turbine blade top of the engine. The turbine casing is subject to main thermal, mechanical load and pneumatic load, and the working environment is relatively bad. As one of hot end components of the engine, when the turbine casing is cooled by using a cooling medium, on one hand, it is necessary to ensure that the maximum operating temperature of the surface of the turbine casing is lower than that of mainstream gas and does not exceed the heat resistance limit of the material of the turbine casing; on the other hand, the surface temperature of the turbine casing after cooling is as uniform as possible, so that the temperature gradient of the surface is reduced, and excessive thermal stress is avoided.

Generally, the turbine casing is cooled by using air from outer ducts, wherein a plurality of ventilation holes for the air in the outer ducts to pass through are formed in the guide vane. The air in the outer ducts cools the surface and the interior of the turbine casing by means of impact cooling through the ventilation holes. However, excessive amount of air in the outer ducts may be consumed by using air in the outer ducts, resulting in excessive total pressure loss of mainstream gas.

SUMMARY

In order to reduce the loss of the amount of air in outer ducts in the process of cooling the turbine casing, the present disclosure provides an integral cooling system for a turbine casing and guide vanes in an aeroengine.

The integral cooling system for a turbine casing and guide vanes in an aeroengine provided by the present disclosure adopts the following technical solutions.

According to an integral cooling system for a turbine casing and guide vanes in an aeroengine, an inner guide ring and a plurality of guide vanes are mounted on the turbine casing;

the cooling system comprises an electromagnetic pump, a heat exchanger, an expansion joint and a cooling pipeline;

an annular cavity is provided in the turbine casing, the cooling pipeline is mounted on an inner wall of the annular cavity and periodically and uniformly distributed along a circumferential direction of the turbine casing, and the cooling pipeline is filled with cooling liquid;

a mounting cavity is further provided in the turbine casing, and the mounting cavity communicates with the annular cavity; the electromagnetic pump, the expansion joint and the heat exchanger are all mounted in the mounting cavity, and one of connecting ports of the electromagnetic pump communicates with the cooling pipeline; and one end of the expansion joint communicates with another connecting ports of the electromagnetic pump, another end of the expansion joint communicates with one of connecting ports of the heat exchanger, and another connecting ports of the heat exchanger communicates with the cooling pipeline.

By adopting the technical solution, in order to reduce the loss of the amount of air in outer ducts in the process of cooling of the turbine casing, the electromagnetic pump and the heat exchanger are turned on in the process that the turbine casing needs to be cooled. The cooling liquid in the cooling pipeline flows in a closed loop formed by the cooling pipeline, the electromagnetic pump, the expansion joint and the heat exchanger under the action of the electromagnetic pump. Meanwhile, due to the effect of the heat exchanger, the temperature of the cooling liquid can be reduced, so that the purpose of cooling the turbine casing is achieved through the circulating cooling liquid. Therefore, the reduction of the loss of air in the outer ducts in the process of cooling the turbine casing is facilitated, and finally the effect of increasing the thrust of the engine is achieved.

Preferably, each guide vane is correspondingly connected with two vertical connecting pipes on the cooling pipeline, an accommodating cavity is provided in the guide vane, and the vertical connecting pipes both communicate with the accommodating cavity; and the cooling liquid in the cooling pipeline is able to flow into the accommodating cavity through the two vertical connecting pipes.

By adopting the technical solution, cooling liquid is introduced into the guide vane through the two vertical connecting pipes while the turbine casing is cooled, so that the guide vanes are also filled with the cooling liquid, and then the cooling of the guide vanes is facilitated while the turbine casing is cooled.

Preferably, the accommodating cavity comprises a first cooling cavity, a second cooling cavity and a third cooling cavity; and for the two vertical connecting pipes corresponding to the guide vane, one of the vertical connecting pipes communicates with the first cooling cavity, and another of the vertical connecting pipes communicates with the third cooling cavity;

first circulation channels and second circulation channels are provided in the guide vane, one end of the each first circulation channel communicates with the first cooling cavity, and another end of each first circulation channel communicates with the second cooling cavity; and one end of the circulation channel II communicates with the cooling cavity II, and another end of each second circulation channel communicates with the third cooling cavity.

By adopting the technical solution, in order to facilitate the enhancement of the cooling effect after the cooling liquid is introduced into the guide vane, the cooling liquid introduced into the guide vane firstly enters the first cooling cavity, then successively flows into the second cooling cavity and the third cooling cavity through the first circulation channel and the second circulation channel, and then returns to the cooling pipeline again through the third cooling cavity and the vertical connecting pipe. Therefore, the path through which the cooling liquid flows in the guide vane is increased, so that the residence time of the cooling liquid in the guide vane is increased, and the cooling effect after the cooling liquid is introduced into the guide vane is enhanced.

Preferably, the accommodating cavity comprises a plurality of fourth cooling cavities and a plurality of fifth cooling cavities, the plurality of fourth cooling cavities are located on a same side of the guide vane, and plurality of fifth cooling cavities are located on another side of the guide vane; the two vertical connecting pipes corresponding to the guide vane communicate with two of the fourth cooling cavities in one-to-one correspondence;

a plurality of third circulation channels are further provided in the guide vane, one end of the third circulation channel communicates with one of the fourth cooling cavities, another end of said third circulation channel communicates with one of the fifth cooling cavities, and the cooling liquid introduced into the guide vane is able to successively pass through the fourth cooling cavities, the fifth cooling cavities and the third circulation channels.

By adopting the technical solution, in order to facilitate the enhancement of the cooling effect after the cooling liquid is introduced into the guide vane, the cooling liquid introduced into the guide vane through the vertical connecting pipe firstly flows into one of the cooling cavities IV, then flows into one of the cooling cavities V under the action of one of the circulation channels III, then flows into the other cooling cavity IV through the other circulation channel II, and then flows in the guide 3 according to the same rule until the cooling liquid is introduced into the last cooling cavity IV and returns the cooling pipeline through the vertical connecting pipe. Therefore, the path through which the cooling liquid flows in the guide vane is increased, so that the residence time of the cooling liquid in the guide vane is increased, and the cooling effect after the cooling liquid is introduced into the guide vane is enhanced.

Preferably, the accommodating cavity comprises a first cooling cavity, a second cooling cavity and a third cooling cavity; and for the two vertical connecting pipes of the guide vane, one of the vertical connecting pipes communicates with the first cooling cavity, and the other of the vertical connecting pipes communicates with the third cooling cavity;

a plurality of fourth circulation channels are provided in the guide vane, the plurality of fourth circulation channels are uniformly distributed along the circumference of the guide vane, one end of each fourth circulation channel communicates with the second cooling cavity, another end of one part of the fourth circulation channels communicates with the first cooling cavity, and another end of another part of the fourth circulation channels communicates with the third cooling cavity.

By adopting the technical solution, in order to facilitate the enhancement of the cooling effect after the cooling liquid is introduced into the guide vane, after the cooling liquid enters the first cooling cavity through the vertical connecting pipe, the cooling liquid successively enters the second cooling cavity and the third cooling cavity under the action of the multiple fourth circulation channels, and therefore the residence time of the cooling liquid in the guide vane can be enhanced, and the cooling effect after the cooling liquid is introduced into the guide vane is achieved. Meanwhile, since the fourth circulation channels are distributed along the circumferential direction of the guide vane, the cooling temperature on the circumferential side of the guide vane is relatively uniform, thus, the possibility that the expansion ratios of the guide vanes is different due to the large temperature difference between different parts of the guide vane, resulting in bulging or deforming possibility of the guide vanes is reduced.

Preferably, the guide vanes are uniformly distributed along the circumferential direction of the inner guide ring, a plurality of mounting grooves are provided on the inner circumferential surface of the turbine casing, the guide vanes are plug-fitted with the mounting grooves in one-to-one correspondence, and the inner guide ring and the guide vanes are mounted in the turbine casing in a cold mounting manner.

By adopting the technical solution, in the process that the inner guide ring and the guide vanes are mounted, the inner guide ring and the guide vanes are contracted in a low temperature state in a cold mounting manner. Then, the inner guide ring and the guide vanes are moved into the turbine casing, and then the inner guide ring and the guide vanes are expanded under the effect of gradually recovering temperature. Moreover, the guide vanes are inserted into the mounting grooves in one-to-one correspondence, and then the purpose of mounting the inner guide ring and the guide vanes is achieved.

Preferably, a plurality of first connecting grooves are provided in an inner wall of the turbine casing, each guide vane is fixedly connected with one of the plurality of first connecting blocks, and the first connecting blocks are arranged in one-to-one correspondence with the first connecting grooves. Each guide vane is further fixedly connected with a second connecting block, a plurality of second connecting grooves are provided on the inner guide ring, and the second connecting blocks are mounted on the inner walls of the second connecting grooves in one-to-one correspondence.

By adopting the technical solution, the sealing gasket is used. On one hand, the rigid contact between the guide vane and the inner wall of the mounting groove can be reduced, and on the other hand, the stability of inserting the guide vane into the mounting groove can be enhanced.

Preferably, a plurality of sealing gaskets is mounted on the turbine casing corresponding to the guide vanes, and the sealing gaskets abut against the guide vanes.

By adopting the technical solution, the inner guide ring and the guide vanes are conveniently mounted in the turbine casing by using the bodies of the first connecting groove and the second connecting groove.

Preferably, the cooling liquid in the cooling pipeline is liquid metal or alloy at normal temperature.

By adopting the technical solution, the absorption and transportation of heat are facilitated by using the liquid metal or alloy, so that the cooling effect of the turbine casing and the guide vanes is enhanced.

In conclusion, the present disclosure has at least one of the following beneficial technical effects:

Firstly, in order to reduce the loss of the amount of air in outer ducts in the process of cooling of the turbine casing, the electromagnetic pump and the heat exchanger are turned on in the process that the turbine casing needs to be cooled. The cooling liquid in the cooling pipeline flows in a closed loop formed by the cooling pipeline, the electromagnetic pump, the expansion joint and the heat exchanger under the action of the electromagnetic pump. Moreover, due to the effect of the heat exchanger, the temperature of the cooling liquid can be reduced, so that the purpose of cooling the turbine casing is achieved through the flowing cooling liquid. Therefore, the reduction of the loss of air in the outer ducts in the process of cooling the turbine casing is facilitated, and finally the effect of increasing the thrust of the engine is achieved.

Secondly, in order to facilitate the enhancement of the cooling effect after the cooling liquid is introduced into the guide vane, the cooling liquid introduced into the guide vane firstly enters the cooling cavity I, then successively flows into the cooling cavity II and the cooling cavity III through the circulation channel I and the circulation channel II, and then returns to the cooling pipeline again through the cooling cavity III and the vertical connecting pipe. Therefore, the path through which the cooling liquid flows in the guide vane is increased, so that the residence time of the cooling liquid in the guide vane is increased, and the cooling effect after the cooling liquid is introduced into the guide vane is enhanced.

Reference signs in the attached figures: 1, turbine casing; 11, casing shell I; 12, casing shell II; 13, annular cavity; 14, mounting cavity; 15, avoidance hole; 16, mounting groove; 17, sealing gasket; 171, through hole; 18, first connecting groove; 2, inner guide ring; 21, second connecting groove; 3, guide vane; 31, first circulation channel; 32, second circulation channel; 33, third circulation channel; 34, fourth circulation channel; 35, first connecting block; 36, second connecting block; 4, accommodating cavity; 41, first cooling cavity; 42, second cooling cavity; 43, third cooling cavity; 44, fourth cooling cavity; 45, fifth cooling cavity; 46, connecting hole; 5, heat exchanger; 51, electromagnetic pump; 52, expansion joint; 6, cooling pipeline; and 61, vertical connecting pipe.

DETAILED DESCRIPTION

The following describes the present disclosure in detail with reference to FIG. 1 to FIG. 9.

The embodiment of the present disclosure is an integral cooling system for a turbine casing and guide vanes in an aeroengine.

Embodiment I

Figure 1:
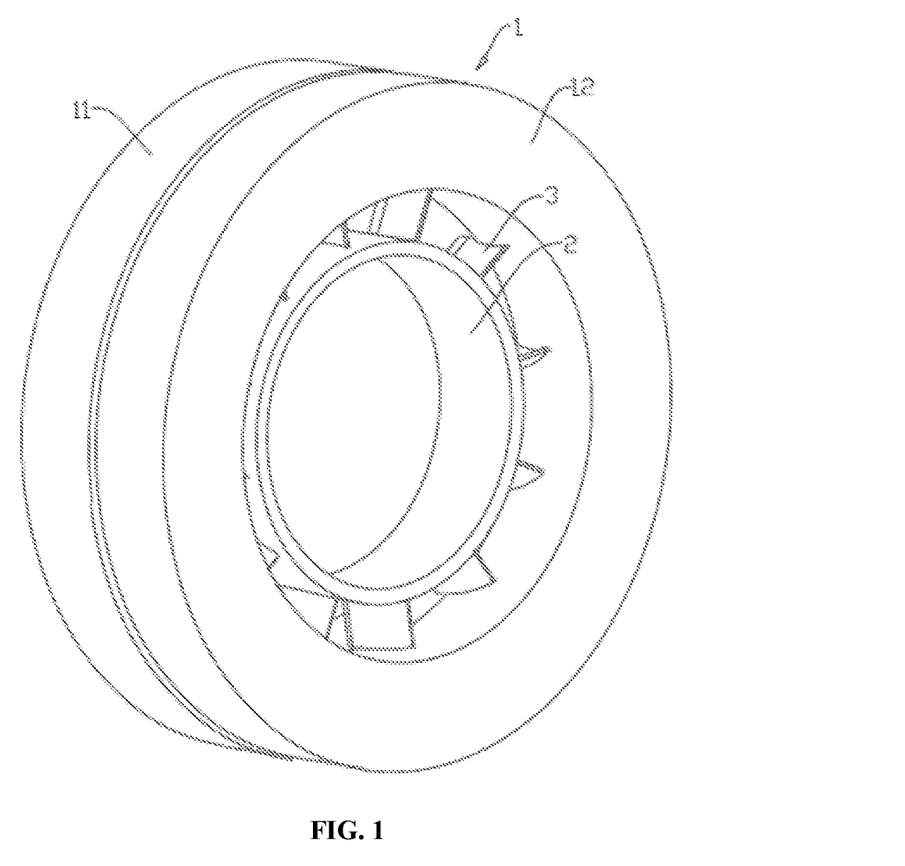
FIG. 1 is a schematic diagram of an integral structure in the first embodiment of the present disclosure.
Figure 2:
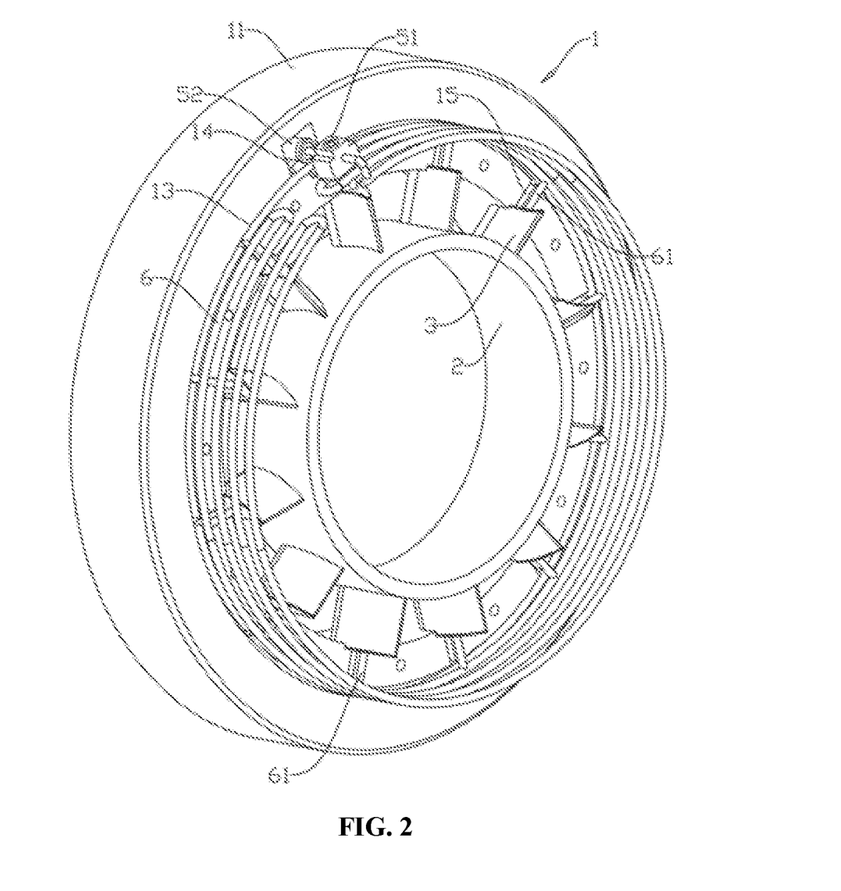
FIG. 2 is a structural schematic diagram for highlighting a cooling pipeline in the first embodiment of the present disclosure.

As shown in FIG. 1 and FIG. 2, integral cooling system for a turbine casing and guide vanes in an aeroengine comprises a heat exchanger 5, an electromagnetic pump 51, an expansion joint 52 and a cooling pipeline 6, wherein an annular cavity 13 and a mounting cavity 14 are provided in the turbine casing 1, the mounting cavity 14 communicates with the annular cavity 13, and the cooling pipeline 6 is mounted on the inner wall of the annular cavity 13 and periodically and uniformly distributed in the annular cavity 13 along the circumferential direction of the turbine casing 1.

Figure 3:
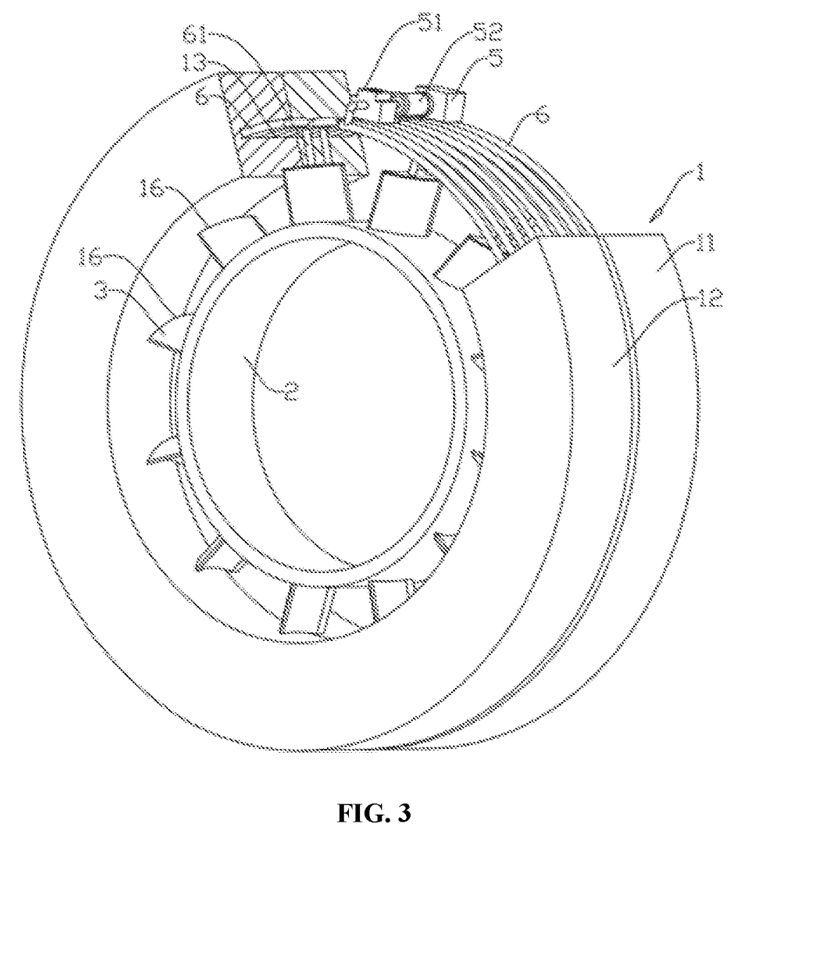
FIG. 3 is a section view of a turbine casing in the first embodiment of the present disclosure.

As shown in FIG. 2 and FIG. 3, the heat exchanger 5, the electromagnetic pump 51 and the expansion joint 52 are all mounted on the inner side wall of the mounting cavity 14. Two connecting ports of the electromagnetic pump 51 are respectively a liquid inlet port and a liquid outlet port, wherein the liquid inlet port of the electromagnetic pump 51 communicates with the one end of the cooling pipeline 6, and the liquid outlet port of the electromagnetic pump 51 is connected with one end of the expansion joint 52. Two connecting ports of the heat exchanger 5 are respectively a liquid inlet port and a liquid outlet port, wherein the liquid inlet port of the heat exchanger 5 is connected with the other end of the expansion joint 52, and the liquid outlet port of the heat exchanger 5 communicates with the other end of the cooling pipeline 6. Wherein, the expansion joint 52 can compensate for the increased amount of deformation caused by expansion of the metal due to the increase in temperature.

As shown in FIG. 2 and FIG. 3, the cooling pipeline 6 is filled with cooling liquid. The cooling pipeline 6, the electromagnetic pump 51, the expansion joint 52 and the heat exchanger 5 constitute a closed liquid circulation loop. In the working process of starting the electromagnetic pump, the electromagnetic pump 51 can drive the cooling liquid in the cooling pipeline 6 to flow. After the cooling liquid discharged from the liquid outlet port of the electromagnetic pump 51 successively passes through the expansion joint 52, the heat exchanger 5 and the cooling pipeline 6, the other end of the cooling pipeline 6 enters the liquid inlet port of the electromagnetic pump 51. It should be noted that, in the present disclosure, the cooling liquid in the cooling pipeline 6 is low-melting-point liquid metal or alloy at normal temperature, such as gallium or gallium-based alloy.

As shown in FIG. 1 and FIG. 3, the turbine casing 1 comprises a first casing shell 11 and a second casing shell 12. The first casing shell 11 and the second casing shell 12 are fixed in welding and other manners. A first annular sub-cavity and a first mounting sub-cavity are provided in the first casing shell 11, and an second annular sub-cavity and a second mounting sub-cavity are provided in the second casing shell 12, wherein the annular cavity 13 is composed by the first annular sub-cavity and the second annular sub-cavity together, and the mounting cavity 14 is composed by the first mounting sub-cavity and the second mounting sub-cavity together.

Figure 4:
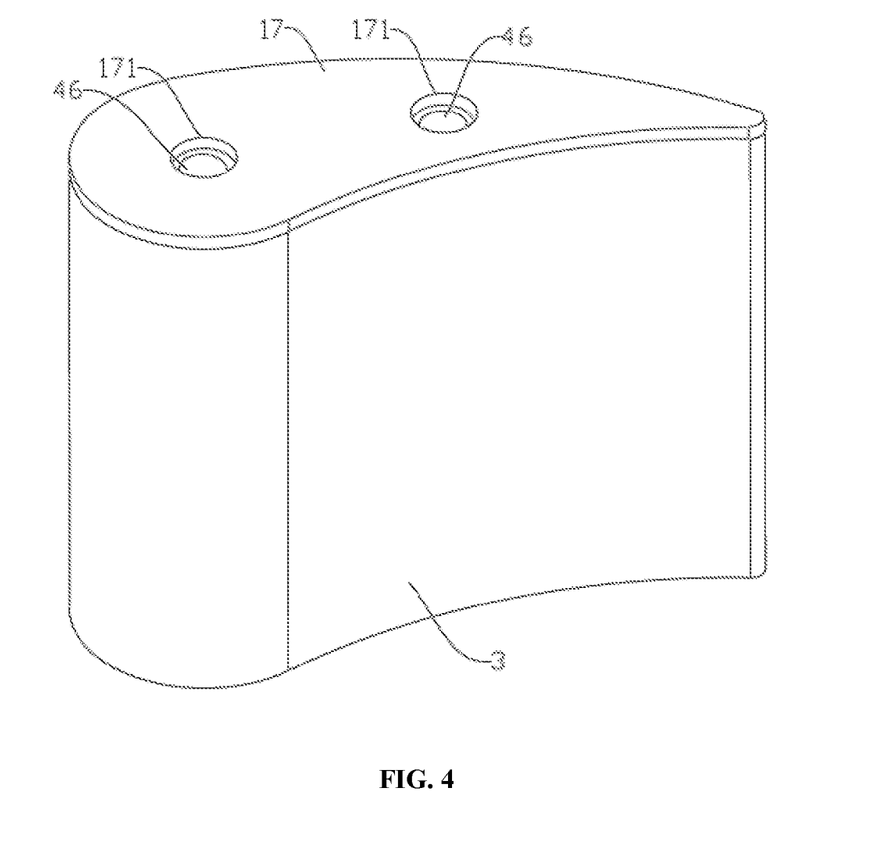
FIG. 4 is a structural schematic diagram of a guide vane in the first embodiment of the present disclosure.

As shown in FIG. 3 and FIG. 4, in the first embodiment of the present disclosure, an inner guide ring 2 and a plurality of guide vanes 3 are further mounted in the turbine casing 1, the guide vanes 3 are fixedly connected to the inner guide ring 2, and the guide vanes 3 are uniformly distributed along the circumferential direction of the inner guide ring 2.

When the inner guide ring 2 and the guide vanes are mounted, the inner guide ring 2 and the guide vanes 3 are contracted in a low temperature state in a cold mounting manner. Then, the inner guide ring 2 and the guide vanes 3 are moved into the turbine casing 1, and then the inner guide ring 2 and the guide vanes 3 are expanded under the effect of gradually recovering temperature. Moreover, the guide vanes 3 are inserted into the mounting grooves 16 in one-to-one correspondence, and then the purpose of mounting the inner guide ring 2 and the guide vanes 3 is achieved.

Figure 5:
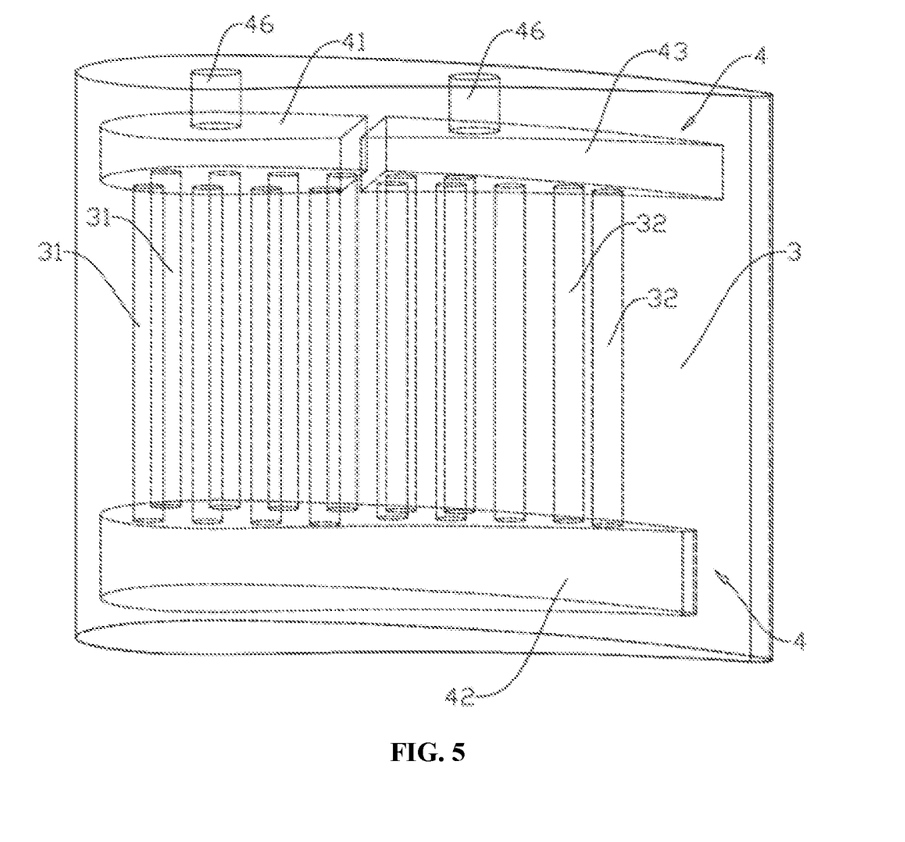
FIG. 5 is an internal structural schematic diagram of a guide vane in the first embodiment of the present disclosure.

As shown in FIG. 3, FIG. 4 and FIG. 5, a plurality of mounting grooves 16 are formed in the inner peripheral surface of the turbine casing 1. The mounting grooves 16 are arranged in one-to-one correspondence with the guide vanes 3, and the ends, away from the inner guide ring 2, of the guide vanes 3 are plug-fitted with the mounting grooves 16 in one-to-one correspondence. The inner wall of each mounting groove 16 is fixedly connected with a sealing gasket 17, and the sealing gasket 17 abuts against the guide vane 3. By arranging the sealing gasket 17, on one hand, the stability of inserting the guide vane 3 into the mounting groove 16 can be enhanced, and on the other hand, the rigid contact between the guide vane 3 and the side wall of the mounting groove 16 can be reduced.

An accommodating cavity 4 is provided in the guide vane 3. The cooling pipeline 6 corresponding to each guide vane 3 is connected with two vertical connecting pipes 61. An avoidance hole 15 for the two vertical connecting pipes 6 to pass through are formed in the turbine casing 1, and the vertical connecting pipes 61 both communicate with the accommodating cavity 4. The cooling liquid in the cooling pipeline 6 can flow into the accommodating cavity 4 through one of the vertical connecting pipes 61, and the cooling liquid in the accommodating cavity returns into the cooling pipeline 6 through the other of the vertical connecting pipes 61.

As shown in FIG. 3, FIG. 4 and FIG. 5, in the first embodiment of the present disclosure, the accommodating cavity 4 comprises a first cooling cavity 41, a second cooling cavity 42 and a third cooling cavity 43. The first cooling cavity 41 and the second cooling cavity 42 are arranged on the side, away from the inner guide ring 2, of the guide vane 3, and the second cooling cavity 42 is arranged on the side, close to the inner guide ring 2, of the guide vane 3. Two connecting holes 46 are further formed in the guide vane 3, wherein one connecting hole 46 communicates with the first cooling cavity 41, and the other connecting hole 46 communicates with the second cooling cavity 42.

Two through holes 171 are formed in the sealing gasket 17. The two through holes 171 in the guide vane 3 are formed in one-to-one correspondence with the connecting holes 46, and two vertical connecting pipes 61 corresponding to the guide vane 3 pass through the two through holes 171 in one-to-one correspondence. The first cooling cavity 41 communicates with one vertical connecting pipe 61 through the connecting hole 46, and the third cooling cavity 43 communicates with the other vertical connecting pipe 61 through the connecting hole 46. By arranging the through hole 171 in the sealing gasket 17, the sealing performance between the vertical connecting pipe 61 and the connecting hole 46 is enhanced.

A plurality of first circulation channels 31 and a plurality of second circulation channels 32 are further formed in a guider. One end of each first circulation channel 31 communicates with the first cooling cavity 41, and the other end of each first circulation channel 31 communicates with the second cooling cavity. One end of each second circulation channel 32 communicates with the second cooling cavity 42, and the other end of each second circulation channel 32 communicates with third cooling cavity 43.

The implementation principle of the first embodiment of the present disclosure is as follows: in the process of cooling the turbine casing 1 and the guide vanes 3, the electromagnetic pump 51 is turned on so that the electromagnetic pump 51 drives the cooling liquid in the cooling pipeline 6 to flow. The flowing cooling liquid can take away most of heat in the turbine casing 1. After the cooling liquid flows through the heat exchanger 5, the heat exchanger 5 can take away most of heat in the cooling liquid, so that the purpose of cooling the turbine casing 1 is achieved. When the flowing cooling liquid flows through the guide vane 3, the cooling liquid enters the first cooling cavity 41 through one of the vertical connecting pipes 61, then the cooling liquid passes through the first circulation channel 31 and the second circulation channel 32, successively enters the second cooling cavity 42 and the third cooling cavity 43, and then returns to the cooling pipeline 6 through the third cooling cavity 43 and the other vertical connecting pipe 61, so that the guide vane 3 plays a cooling effect. Moreover, through the first cooling cavity 41, the first circulation channel 31, the second cooling cavity 42, the second circulation channel 32 and the third cooling cavity 43, the flow path of the cooling liquid in the guide vane 3 is increased, so that the cooling effect of the cooling liquid on the guide vane 3 is increased.

Embodiment II

Figure 6:
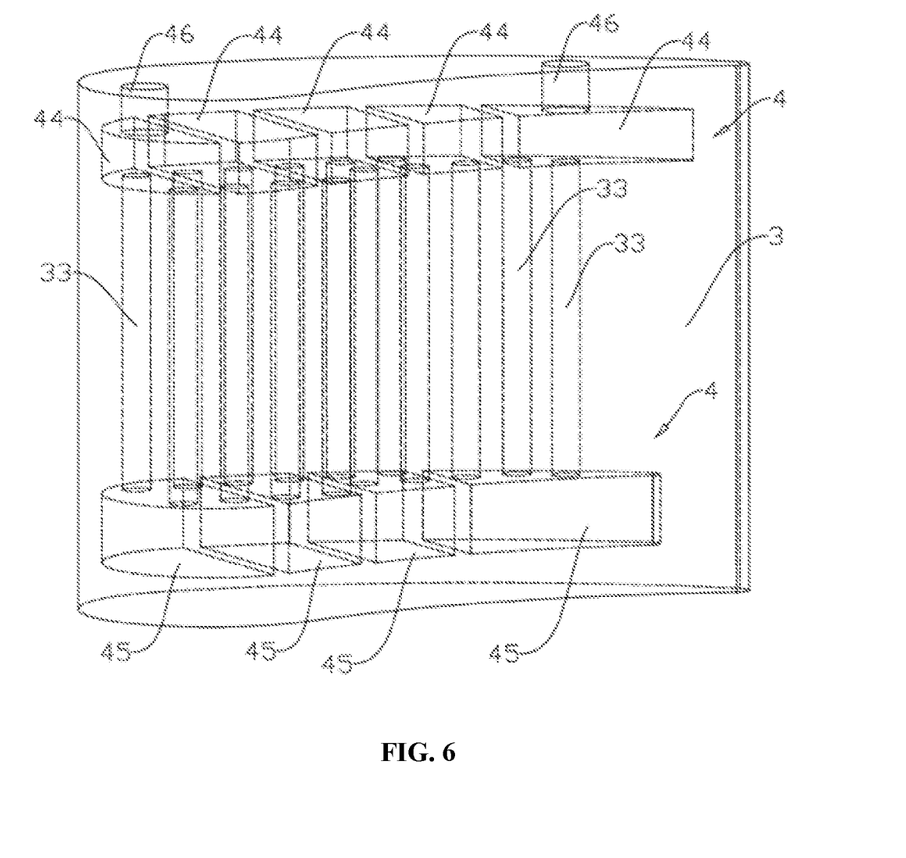
FIG. 6 is an internal structural schematic diagram of a guide vane in the second embodiment of the present disclosure.

As shown in FIG. 6, the difference between the second embodiment of the present disclosure and the first embodiment of the present disclosure only lies in the guide vanes 3. In the second embodiment of the present disclosure, the accommodating cavity 4 in the guide vane 3 comprises a plurality of fourth cooling cavities 44 and a plurality of fifth cooling cavities 45. In the second embodiment of the present disclosure, the number of the fourth cooling cavities 44 is preferably five, the number of the fifth cooling cavities 45 is preferably four; and moreover, the fourth cooling cavities 44 are all located on the side, away from the inner guide ring 2, of the guide vane 3, and the fifth cooling cavities 45 are all located on the side, close to the inner guide ring 2, of the guide vane 3.

Two connecting holes 46 are further formed in the guide vane 3. The two connecting holes 46 communicate with the two fourth cooling cavities 44 in one-to-one correspondence. Corresponding to two vertical connecting pipes 61 in the guide vane 3, the two vertical connecting pipes 61 communicate with the two fourth cooling cavities 44 are in one-to-one correspondence through the connecting holes 46.

A plurality of third circulation channels 33 are further formed in the guide vane 3. One of the third circulation channels 33 communicates with the fourth cooling cavity 44. The other end of the third circulation channel 33 communicates with the fourth cooling cavity 45. The cooling liquid introduced into the guide vane 3 can successively pass through the fourth cooling cavities 44 and the fifth cooling cavities 45.

The implementation principle of the second of the present disclosure is as follows: in order to facilitate the enhancement of the cooling effect after the cooling liquid is introduced into the guide vane 3, the cooling liquid introduced into the guide vane 3 through the vertical connecting pipe 61 firstly flows into one of the fourth cooling cavities 44, then flows into one of the fifth cooling cavities 45 under the action of one of the third circulation channels 3, then flows into the other fourth cooling cavity 44 through the other third circulation channel 33, and then flows in the guide vane 3 according to the same rule until the cooling liquid is introduced into the last fourth cooling cavity 44 and returns the cooling pipeline 6 through the vertical connecting pipe 61. Therefore, the path through which the cooling liquid flows in the guide vane 3 is increased, so that the residence time of the cooling liquid in the guide vane 3 is increased, and the cooling effect after the cooling liquid is introduced into the guide vane 3 is enhanced.

Embodiment III

Figure 7:
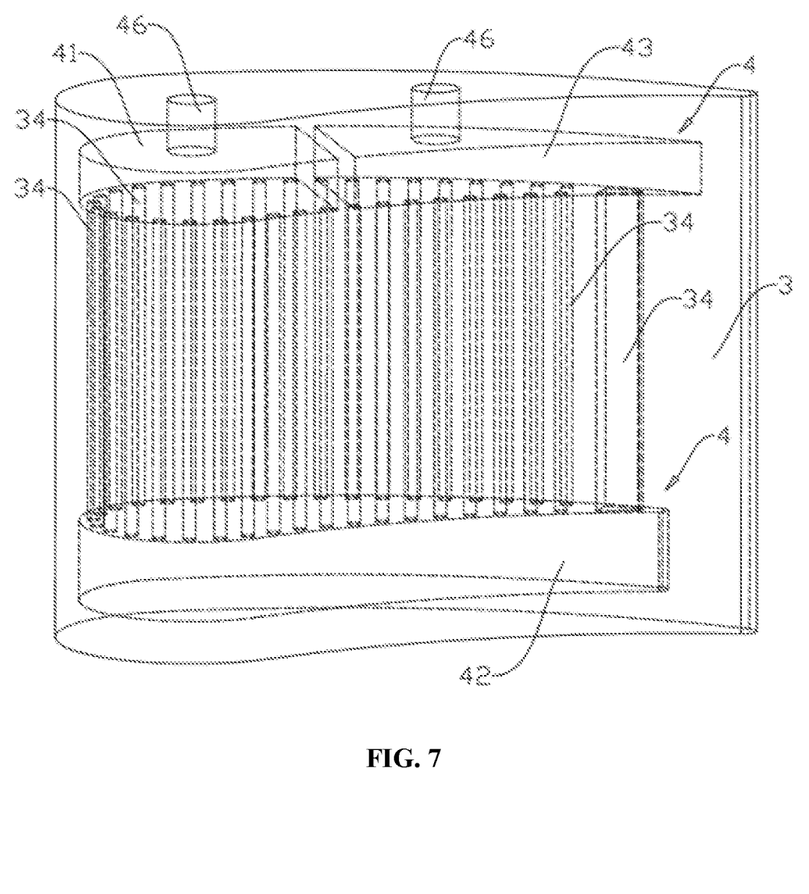
FIG. 7 is an internal structural schematic diagram of a guide vane in the third embodiment of the present disclosure.

As shown in FIG. 7, the difference between the third embodiment of the present disclosure and the first embodiment of the present disclosure lies in the manner of communicating the first cooling cavity 41, the second cooling cavity 42 and the third cooling cavity 43 in the guide vane 3. In third embodiment of the present disclosure, a plurality of fourth circulation channels 34 are further formed in the guide vane 3, wherein one end of all the fourth circulation channels 34 communicate with the second cooling cavity 42, and the other ends of one part of the fourth circulation channels 34 communicate with the first cooling cavity 41, and the other ends of the other part of the fourth circulation channels 34 communicate with the third cooling cavity 43.

The implementation principle of the third embodiment of the present disclosure is as follows: in order to facilitate the enhancement of the cooling effect after the cooling liquid is introduced into the guide vane 3, after the cooling liquid enters the first cooling cavity 41 through the vertical connecting pipe 61, the cooling liquid successively enters the second cooling cavity 42 and the third cooling cavity 43 under the action of the multiple fourth circulation channels 34, and therefore the residence time of the cooling liquid in the guide vane 3 can be enhanced, and the cooling effect after the cooling liquid is introduced into the guide vane 3 is achieved. Moreover, since the fourth circulation channels 34 are distributed along the circumferential direction of the guide vane 3, the cooling temperature on the circumferential side of the guide vane 3 is relatively uniform, thus, the possibility that the expansion ratios of the guide vanes 3 is different due to the large temperature difference between different parts of the guide vane 3, resulting in bulging or deforming possibility of the guide vanes 3.

Embodiment IV

Figure 8:
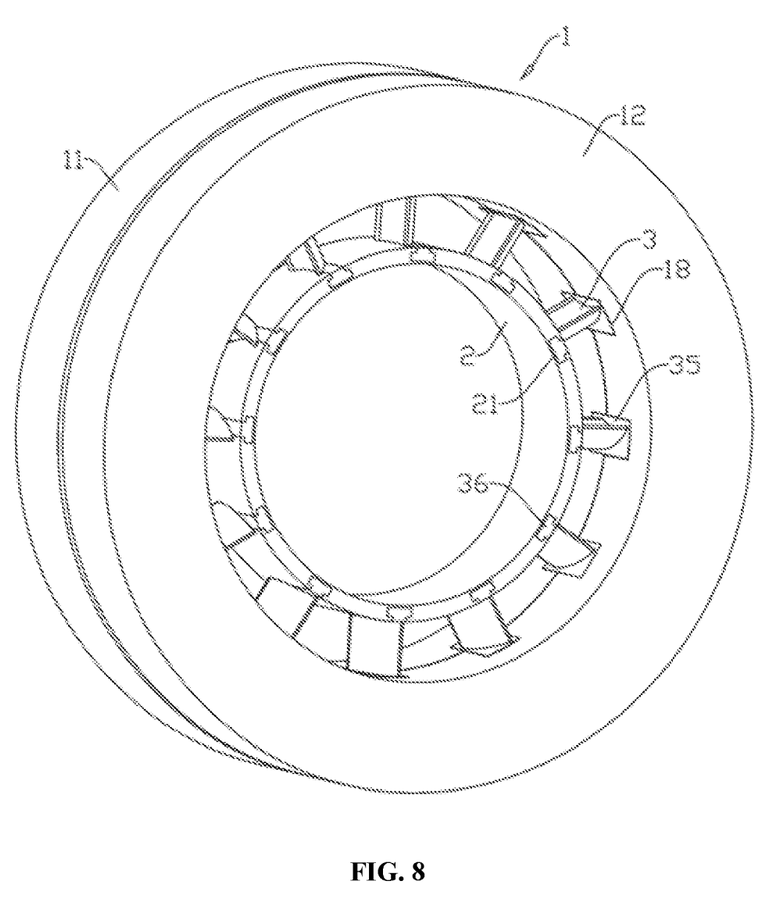
FIG. 8 is a schematic diagram of an integral structure in the fourth embodiment of the present disclosure.
Figure 9:
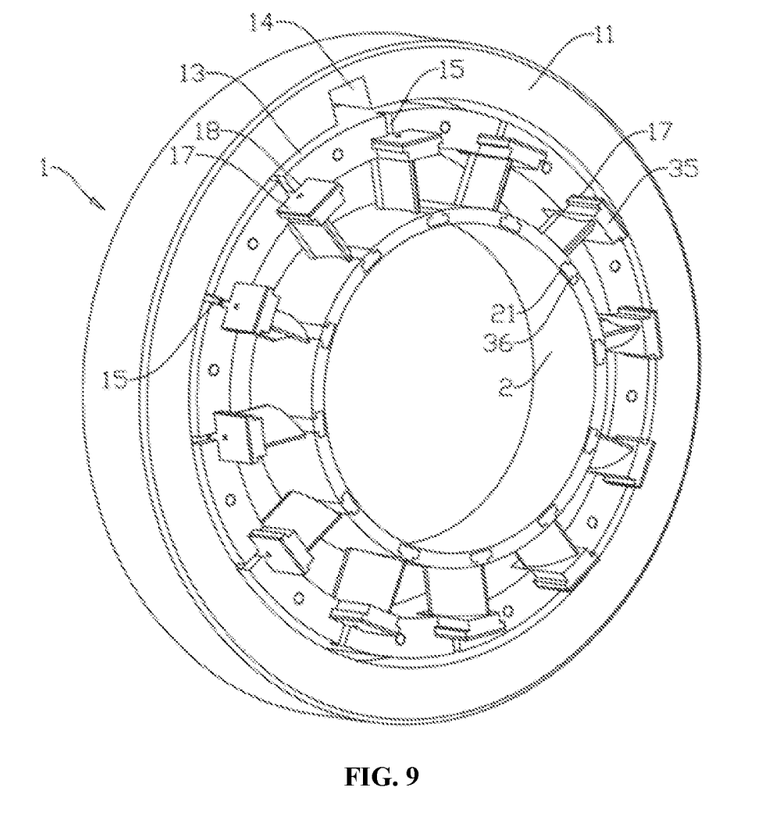
FIG. 9 is a structural schematic diagram for highlighting the connection type of guide vanes and a turbine casing in the fourth embodiment of the present disclosure.

As shown in FIG. 8 and FIG. 9, the difference between the fourth embodiment of the present disclosure and the first embodiment of the present disclosure only lies in the connection type of the guide vanes 3 with the inner guide ring and the turbine casing 1. In the fourth embodiment of the present disclosure, a plurality of first connecting grooves 18 are formed in the inner wall of the turbine casing 1, and the first connecting grooves 18 are T-shaped grooves. The multiple guide vanes 3 are all fixedly connected with first connecting blocks 35, and the body of the first connecting block 35 is a T-shaped block. The first connecting blocks 35 are arranged in one-to-one correspondence with the first connecting grooves 18, and the body of the first connecting block 35 abuts against the side wall of the first connecting groove 18 through the sealing gasket 17.

Wherein a connecting sub-groove 1 is formed in the first casing shell 11, and a connecting sub-groove 2 is formed in the second casing shell 12. The first connecting groove 18 is formed by the first connecting sub-groove and the second connecting sub-groove together, and the first connecting block 35 is matched with the first connecting groove 18. When the guide vanes 3 are mounted, the first connecting block 35 is firstly slidably mounted on the inner wall of the first connecting sub-groove, and then the second casing shell 12 is moved, so that the second connecting sub-groove on the second cassette shell 12 is matched with the first connecting block 35, and the purpose of fixing the first connecting block 35 is achieved.

Each guide vane 3 is further fixedly connected with a second connecting block 36. A plurality of second connecting grooves 21 are formed on the inner guide ring 2. The second connecting blocks 36 are slidably mounted on the inner walls of the second connecting grooves 21 in one-to-one correspondence, and the second connecting block 36 slidably mounted on the inner wall of the second connecting groove 21 can be fixed with the inner guide ring 2 in welding and other manners.

The implementation principle of the fourth embodiment of the present disclosure is as follows: the guide vanes 3 and the inner guide ring 2 are conveniently mounted in the turbine casing 1 by using the bodies of the first connecting groove 18 and the second connecting groove 21.

The above embodiment is only a better embodiment of the present disclosure, and does not limit the protection range of the present disclosure, so that equivalent changes made according to the structure, shape and principle of the present disclosure should be covered in the protection range of the present disclosure.

What is claimed is:

1. An integral cooling system for a turbine casing and guide vanes in an aeroengine, wherein an inner guide ring (2) and a plurality of guide vanes (3) are mounted on the turbine casing (1);

the cooling system comprises a heat exchanger (5), an electromagnetic pump (51), an expansion joint (52) and a cooling pipeline (6);

an annular cavity (13) is provided in the turbine casing (1), the cooling pipeline (6) is mounted on an inner wall of the annular cavity (13) and periodically and uniformly distributed along a circumferential direction of the turbine casing (1), and the cooling pipeline (6) is filled with cooling liquid;

a mounting cavity (14) is further provided in the turbine casing (1), and the mounting cavity (14) communicates with the annular cavity (13); the heat exchanger (5), the electromagnetic pump (51) and the expansion joint (52) are all mounted in the mounting cavity (14), and one of connecting ports of the electromagnetic pump (51) communicates with the cooling pipeline (6); and one end of the expansion joint (52) communicates with another of the connecting ports of the electromagnetic pump (51), another end of the expansion joint (52) communicates with one of connecting ports of the heat exchanger (5), and another of the connecting ports of the heat exchanger (5) communicates with the cooling pipeline (6).

2. The integral cooling system for a turbine casing and guide vanes in an aeroengine according to claim 1, wherein each guide vane (3) is correspondingly connected with two vertical connecting pipes (61) on the cooling pipeline (6), an accommodating cavity (4) is formed in each guide vane (3), and the vertical connecting pipes (61) both communicate with the accommodating cavity (4); and the cooling liquid in the cooling pipeline (6) is able to flow into the accommodating cavity (4) through the two vertical connecting pipes (61).

3. The integral cooling system for a turbine casing and guide vanes in an aeroengine according to claim 2, wherein the accommodating cavity (4) comprises a first cooling cavity (41), a second cooling cavity (42) and a third cooling cavity (43); and for the two vertical connecting pipes (61) corresponding to the guide vane (3), one of the vertical connecting pipes (61) communicates with the first cooling cavity (41), and another of the vertical connecting pipes (61) communicates with the third cooling cavity(43);

first circulation channels (31) and second circulation channels (32) are provided in the guide vane (3), one end of each first circulation channel (31) communicates with the first cooling cavity (41), and another end of each first circulation channel (31) communicates with the second cooling cavity (42); and one end of each second circulation channel (32) communicates with the second cooling cavity (42), and another end of each second circulation channel (32) communicates with the third cooling cavity (43).

4. The integral cooling system for a turbine casing and guide vanes in an aeroengine according to claim 2, wherein the accommodating cavity (4) comprises a plurality of fourth cooling cavities (44) and a plurality of fifth cooling cavities (45), the plurality of fourth cooling cavities (44) are located on a same side of the guide vane (3), and the plurality of cooling cavities (45) are located on another side of the guide vane (3); the two vertical connecting pipes (61) corresponding to the guide vane (3) communicate with two of the fourth cooling cavities (44) in one-to-one correspondence;

a plurality of third circulation channels (33) are further provided in the guide vane (3), one end of each third circulation channel (33) communicates with one of the fourth cooling cavities (44), another end of said third circulation channel (33) communicates with one of the fifth cooling cavities (45), and the cooling liquid introduced into the guide vane (3) is able to successively pass through the fourth cooling cavities (44), the fifth cooling cavities (45) and the third circulation channels (33).

5. The integral cooling system for a turbine casing and guide vanes in an aeroengine according to claim 2, wherein the accommodating cavity (4) comprises a first cooling cavity (41), a second cooling cavity (42) and a third cooling cavity (43); and for the two vertical connecting pipes (61) corresponding to the guide vane (3), one of the vertical connecting pipes (61) communicates with the first cooling cavity (41), and the other of the vertical connecting pipes (61) communicates with the third cooling cavity (43); and a plurality of fourth circulation channels (34) are provided in the guide vane (3), the plurality of fourth circulation channels (34) are uniformly distributed along the circumference of the guide vane (3), one end of each fourth circulation channel (34) communicates with the second cooling cavity (42), another end of a part of the fourth circulation channels (34) communicates with the first cooling cavity (41), and another end of another part of the fourth circulation channels (34) communicates with the third cooling cavity (43).

6. The integral cooling system for a turbine casing and guide vanes in an aeroengine according to claim 1, wherein the guide vanes (3) are uniformly distributed along the circumferential direction of the inner guide ring (2), a plurality of mounting grooves (16) are provided on the inner circumferential surface of the turbine casing (1), the guide vanes (3) are plug-fitted with the mounting grooves (16) in one-to-one correspondence, and the inner guide ring (2) and the guide vanes (3) are mounted in the turbine casing (1) in a cold mounting manner.

7. The integral cooling system for a turbine casing and guide vanes in an aeroengine according to claim 1, wherein a plurality of first connecting grooves (18) are provided in an inner wall of the turbine casing (1), each guide vane (3) is fixedly connected with one of a plurality of first connecting blocks (35), and the first connecting blocks (35) are mounted on the inner walls of the first connecting grooves (18) in one-to-one correspondence; each guide vane (3) is further fixedly connected with one of a plurality of second connecting blocks (36), a plurality of second connecting grooves (21) are formed in the inner guide ring (2), and the second connecting blocks (36) are mounted on the inner walls of the second connecting grooves (21) in one-to-one correspondence.

8. The integral cooling system for a turbine casing and guide vanes in an aeroengine according to claim 6, wherein a plurality of sealing gaskets (17) are mounted on the turbine casing (1) corresponding to the guide vanes (3), and the sealing gaskets (17) abut against the guide vanes (3).

9. The integral cooling system for a turbine casing and guide vanes in an aeroengine according to claim 7, wherein a plurality of sealing gaskets (17) are mounted on the turbine casing (1) corresponding to the guide vanes (3), and the sealing gaskets (17) abut against the guide vanes (3).

10. The integral cooling system for a turbine casing and guide vanes in an aeroengine according to claim 1, wherein the cooling liquid in the cooling pipeline (6) is liquid metal or alloy at normal temperature.

\* \* \* \* \*